Sept. 30, 1969 F. E. SHASHOUA 3,470,310

COLOR IMAGE DISPLAY SYSTEM UTILIZING A LIGHT VALVE

Filed May 23, 1966

INVENTOR.
FRED. E. SHASHOUA
BY
W. H. Spouagle
ATTORNEY 3,470,310

COLOR IMAGE DISPLAY SYSTEM UTILIZING A LIGHT VALVE

Fred Ezra Shashoua, Cherry Hill, N.J., assignor to RCA Corporation, a corporation of Delaware Filed May 23, 1966, Ser. No. 552,070
Int. Cl. H04n 1/46, 9/02
U.S. Cl. 178—5.2 9 Claims

ABSTRACT OF THE DISCLOSURE

A light valve including a birefringent crystal scanned by an electron beam which is modulated by spatially separated component color video signals is disposed in an optical path between first and second light polarizers. A source directs white light through the first polarizer. The plane of polarization of such light is changed to a degree corresponding to the intensity of the scanning electron beam and is emitted from the second polarizer as black and white images of the component colors. These images are passed through a color selector in the optical path such that a composite color image may be projected onto a viewing screen.

This invention relates to relatively large area color image display systems and particularly to such systems employing a light valve and the spatial color filtering technique.

Light valves having electro-optic crystals which have a birefringent property under an applied electric field (Pockel's effect) have been proposed for the projection of black and white images. Also, a plurality of such light valves have been suggested for the large scale reproduction by projection of color images.

It is an object of the present invention to provide a color image display system using a single light valve.

In accordance with an illustrative embodiment of the invention, the light valve includes a pair of crossed light polarizers, a birefringent crystal and means for scanning the crystal with an electron beam. The crystal has the property of rotating the plane of polarization of polarized light to a degree dependent upon the intensity of an applied electric field which, in turn, is created by and is proportional to the intensity of the electron beam. The crystal is located between the pair of crossed polarizers in the path of a beam of collimated white light so that the light issuing from any point of the light valve is determined by the electron beam intensity at a corresponding point on the crystal.

The electron beam of the light valve is modulated by a signal derived by scanning the photosensitive target of a pickup tube upon which is directed light from an object through a plurality of gratings oriented at angles to one another and each consisting of parallel strips of a different selected subtractive primary color interspersed by strips transparent to all colors, whereby to effect a spatial color filtering of the light from the object. Accordingly, the electron beam of the light valve produces a corresponding pattern on the birefringent crystal so that the white light emanating from the light valve is spatially separated as representative of the object colors.

The spatially separated white light is imaged onto a color selector having additive primary color zones located to transmit the related separated components of the white light. The colored light transmitted by the color selector is projected onto a viewing screen to produce a reproduction of the object in color.

For a more detailed description of the invention, reference may be made to the following specification which is given with reference to the accompanying drawings, of which:

Figures 1, 2, 3, 4:
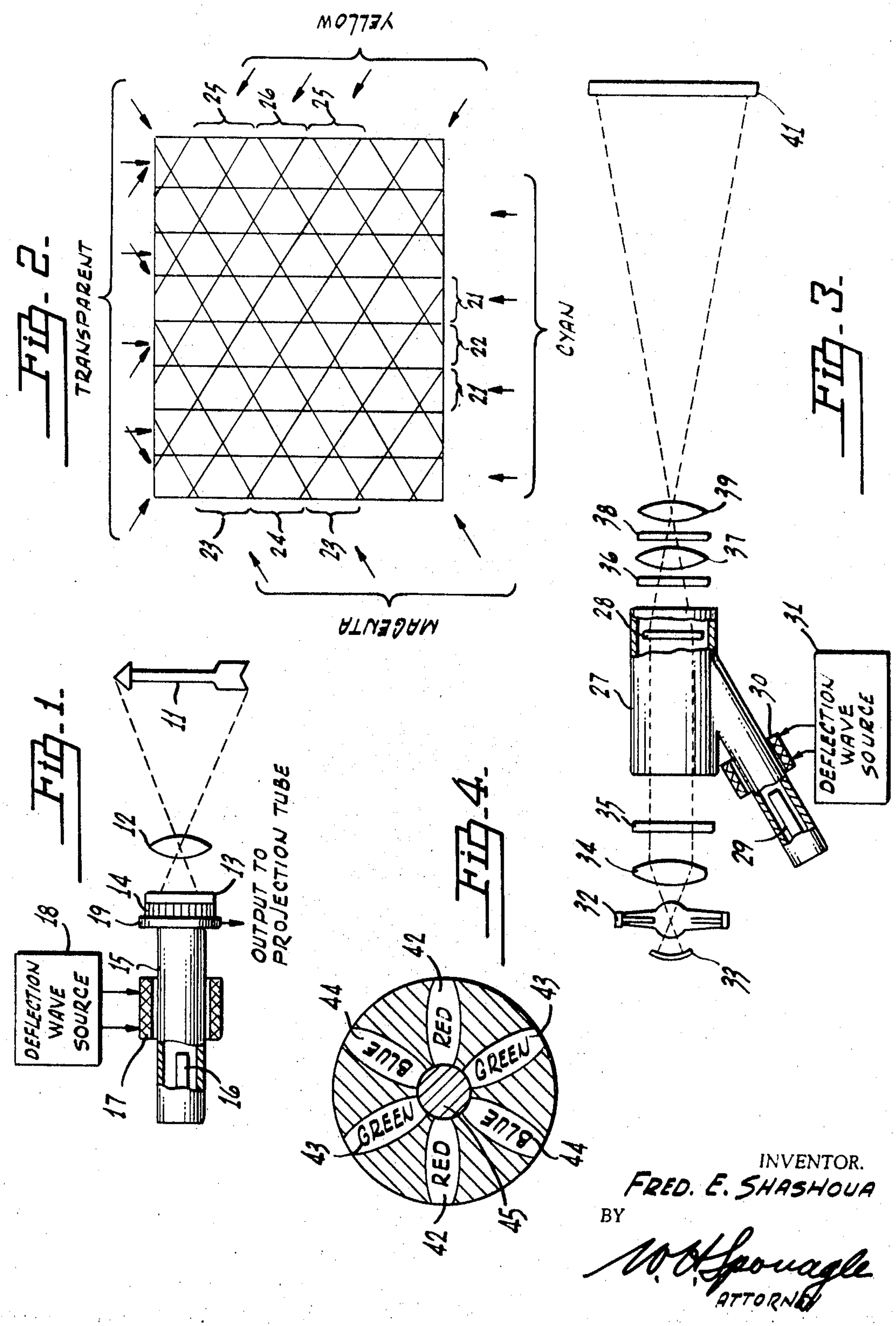
FIGURE 1 is a diagrammatic illustration of apparatus for developing signals by which to control the operation of the display apparatus embodying the invention.
FIGURE 2 is an illustration of one form of spatial filter for use in conjunction with the signal developing apparatus of FIGURE 1.
FIGURE 3 is a diagrammatic representation of an image reproducing system embodying the invention.
FIGURE 4 is an illustration of an optical filter for use in the display system of FIGURE 3.

In FIGURE 1, light from an object 11 is directed by a lens 12 through a spatial color filter 13 and a fibre optics bundle 14 to the photosensitive target electrode (not shown) of an image pickup tube 15 which may be of the photo-conductive type such as a vidicon. The pickup tube 15 is provided with an electron gun 16, the beam from which is deflected under the influence of an electromagnetic deflection yoke 17 suitably energized from a deflection wave source 18 to scan a raster at the target electrode. Thus, video signals are derived from the target ring 19 of the pickup tube 15 which are representative of the pattern of light projected from the object 11 onto the photosensitive target electrode.

The light pattern on the target electrode is one in which three additive primary color components of the light from the object 11 are spatially separated in the manner generally taught by Carlo Bocca in his patent Reissue No. 20,748 granted June 7, 1938. Such spatial separation or filtering of the color light components is effected by the filter 13 of FIGURE 1.

FIGURE 2 is a representative of such a filter. It comprises a plurality of gratings disposed at angles to one another. Each grating consists of a multiplicity of parallel strips of a different selected subtractive primary color interspersed by a multiplicity of strips transparent to all colors. The vertical strips, such as strips 21, are cyan and the alternate vertical strips 22, are transparent. The oblique strips such as strips 23 extending upwardly from left to right at angles of approximately 30°, are magenta and the oblique strips 24 alternating therewith are transparent. The oblique strips, such as strips 25 extending upwardly from right to left angles of approximately 30°, are yellow and the oblique strips 26 alternating therewith are transparent.

The alternate cyan and transparent strips, for example, comprise a diffraction grating for the red parts of the object. Blue and green light from the object passes through both the cyan strips 21 and the transparent strips 22. Red object light, however, is blocked by the cyan strips. The light from each red elemental area of the object, therefore, is diffracted along a line perpendicular to the strips 21 and 22. Similarly, the green light, which is blocked by the magenta strips 23, is diffracted along lines perpendicular to the strips 23 and 24. In like manner, the yellow strips 25 block only blue light so that the blue light from the object is diffracted at right angles to the strips 25 and 26.

Thus, the light pattern on the photosensitive target electrode is one in which the red, green and blue representative portions of the object 11 are spatially separated from one another. When the target electrode is scanned by the electron beam from the gun 16, video signals are developed representative of this light pattern. Such video signals, derived from the target ring 19, may be conveyed to the display apparatus by any suitable means.

The display apparatus of FIGURE 3 includes an electronic light valve 27 having an electro-optical crystal 28 which has a briefringent property under an applied electric field. The degree of birefringence depends upon the magnitude of the field which may be varied by an electron beam derived from an electron gun 29. The electron beam is deflected under the control of a deflection yoke 30 energized by suitable signals derived from a deflection wave source 31 to scan a raster on one face of the crystal 28.

The display system also includes effectively a point source of light 32 which is backed by a reflector 33 so as to provide maximum efficiency in the utilization of the light. The light is collimated by suitable optical means 34 and is polarized by a polarizer 35. The collimated and polarized light is directed through one transparent end wall of the light valve 27 and through the crystal 28. The collimated and polarized light passing through the crystal 28 and the other transparent end wall of the light valve onto a light analyzer 36. The analyzer 36 is a device similar to the polarizer 35 but is oriented at 90° to the polarizer 35 so that, in the absence of any activation of the crystal 28 whereby to rotate the polarization plane of the light entering the light valve 27, no light passes through the analyzer 36.

The light that is passed by the analyzer 36, in a manner presently to be described, is focused by conventional optical means 37 into the plane of a color selective mask 38. A lens system 39 projects a reconstituted color image of the object 11 of FIGURE 1 onto a viewing screen 41.

A suitable form of the color selective mask 38 is shown in FIGURE 4. It comprises a disc which is opaque except for the red, green and blue zones 42, 43 and 44. Each of these zones transmits the designated color component of the white light derived from the light source 32.

The impression of the video signals derived from the target ring 19 of FIGURE 1 upon the electron gun 29 of FIGURE 3 and the described deflection of the electron beam from the gun 29 over the surface of the electro-optical crystal 28 produces a field pattern across the crystal surfaces corresponding to the light pattern produced on the photosensitive target electrode of the pickup tube 15 of FIGURE 1. Hence, the plane of polarization of the collimated and polarized light falling on the respective elemental areas of the crystal 28 is rotated appropriately to effect the transmission of light through corresponding respective elemental areas of the analyzer 36 which is representative of the light falling on corresponding elemental areas of the pickup tube target electrode. The light pattern which is imaged in the plane of the color selective mask 38 has the spatially separated red, green and blue component images of the object 11 of FIGURE 1. By orienting the mask 38 so that the red, green and blue areas 42, 43 and 44 respectively are at right angles to the cyan, magenta and yellow strips 21, 23 and 25 respectively of the filter 13 of FIGURE 2, it is seen that the respective mask areas are in proper positions to pass only light having the colors represented by the spatially separated images. Thus, the three color partial images are combined in perfect registration so that the projection onto the screen 41 of the composite light image is a faithful reproduction of the object.

As is known and indicated in the Bocca patent, a black and white image is found at the center of the mask 38 by the undiffracted portions of the light derived from the object 11 of FIGURE 1. Hence, the center area 45 of the mask 38 may be made entirely opaque or its light transmission capability may be made variable to effect a saturation or chroma control of the projected color image.

Among a number of crystal materials capable of satisfactory performance as the electro-optic crystal 28 of FIGURE 3, one which has been successfully used is deuterated potassium dihydrogen phosphate (KD*P). Experience with such crystals has shown that they are capable of successful operation by means of an electron beam in an evacuated envelope for more than 1,000 hours without noticeable deterioration of performance or poisoning of an oxide cathode of the electron gun.

A suitable example of the light source 32 of FIGURE 3 is a 5-kw. xenon arc which has a luminous output of $220 \times 10^3$ lumens. By using the reflector 33, the arc may be imaged back on itself to increase the brightness of the light source by 50 percent.

Among the advantages to be derived from the use of the invention are the comparative simplicity of the apparatus and the complete freedom from such problems as registration of the component color partial images. These advantages result from the use of a single light valve for all colors in which only one electron beam is used. The color fidelity of the reproduced image, therefore, is not dependent upon the maintenance of precise linearity and synchronization of the electron beam deflection.

What is claimed is:

1. In a system for displaying a composite color image of an object from video signals respectively representative of a plurality of spatially separated component color partial images of an object, the combination comprising:
means for directing white light along an optical path;
a light valve including light polarizing means disposed in said optical path;
means for operating said light polarizing means in response to said video signals to produce a plurality of spatially separated white light partial images in a given plane in said optical path corresponding respectively to said component color partial images of said object; and
a color selector located in said optical path in said given plane and having a plurality of zones capable respectively of transmitting light of a plurality of additive primary colors, each zone being located in the region occupied by the spatially separated white light partial image representing the additive primary color of the zone.

2. A color image display system as defined in claim 1, wherein:
said white light directing means includes apparatus for collimating said light.

3. In a system for displaying a composite color image of an object from video signals respectively representative of a plurality of spatially separated component color partial images of an object, the combination comprising:
means for directing white light along an optical path;
a light valve including a pair of crossed light polarizers located at spaced points in said optical path;
a device for rotating the plane of polarization of said white light;
means for operating said device in response to said video signals to produce a plurality of spatially separated white light partial images in a given plane in said optical path corresponding respectively to said component color partial images of said object; and
a color selector located in said optical path in said given plane and having a plurality of zones capable respectively of transmitting light of a plurality of additive primary colors, each zone being located in the region occupied by the spatially separated white light partial image representing the additive primary color of the zone.

4. A color image display system as defined in claim 3, wherein:
said polarization plane rotating device includes a birefringent crystal, the degree of said rotation being dependent upon the electric field between the surfaces of said crystal; and
means responsive to said video signals for varying said electric field.

5. A color image display system as defined in claim 4, wherein:
said field varying means includes an electron gun for producing an electron beam;
means for modulating the intensity of said beam by said video signals; and
means for deflecting said electron beam over one surface of said crystal to scan a raster thereon.

6. A color image display system in which the spatially separated partial color images of the object and represented by said video signals are produced by a plurality of color selective gratings oriented at angles to one another and as defined in claim 5, wherein:

said color selector zones respectively extend radially from the center of said color selector perpendicularly to the orientation of corresponding ones of said gratings.

7. A color image display system as defined in claim 6, wherein:

said color selector has a pair of said zones for each of said additive primary colors, each pair of zones being disposed diametrically opposite to one another relative to the center of said selector.

8. A color image reproducing system as defined in claim 7, wherein:

said color selector has a central zone which is substantially opaque to light.

9. A color image display system as defined in claim 8, and also including:

a viewing screen; and means for projecting the color light partial images derived from said color selector onto said viewing screen to form a complete color reproduction of said object.

References Cited

UNITED STATES PATENTS

| | | | |
|---|---|---|---|
| 2,473,857 | 6/1949 | Burchell | 350—148 |
| 2,513,520 | 7/1950 | Rosenthal | 178—5.4 |
| 2,514,043 | 7/1950 | Engstrom et al. | 178—5.4 |
| 2,723,305 | 11/1955 | Raibourn | 178—5.4 |
| 3,265,811 | 8/1966 | Ellis | 178—5.4 |

RICHARD MURRAY, Primary Examiner

U.S. Cl. X.R.

178—5.4; 350—148